United States Patent
Yamanishi et al.

[11] Patent Number: 5,917,682
[45] Date of Patent: Jun. 29, 1999

[54] MAGNETIC HEAD AND MANUFACTURING METHOD THEREFOR

[75] Inventors: Hitoshi Yamanishi, Higashiosaka; Isamu Aokura; Koichi Osano, both of Osaka; Yasushi Inoue, Sanda; Fumio Sakai, Nabari, all of Japan

[73] Assignee: Matsushita Electric Industrial Co., Ltd., Osaka-fu, Japan

[21] Appl. No.: 08/925,385

[22] Filed: Sep. 8, 1997

[30] Foreign Application Priority Data

Sep. 9, 1996 [JP] Japan .................................. 8-237718

[51] Int. Cl.⁶ ...................................................... G11B 5/23
[52] U.S. Cl. ........................ 360/119; 360/120; 360/125; 360/126; 428/692
[58] Field of Search ................................... 360/119, 120, 360/125, 126; 428/692, 900

[56] References Cited

U.S. PATENT DOCUMENTS 5,227,193  7/1993  Hori et al. .............................. 427/131

FOREIGN PATENT DOCUMENTS 1-229408  9/1989  Japan .

*Primary Examiner*—Stevan A. Resan
*Attorney, Agent, or Firm*—Wenderoth, Lind & Ponack, L.L.P.

[57] ABSTRACT

A magnetic head includes a back core made of ferrite and a magnetic alloy film arranged in a vicinity of a magnetic gap and having an average composition expressed by $T_xM_yN_z$ wherein T is Fe or Co; M is at least one metal selected from a group consisting of Nb, Zr, Ta, Hf, Cr, W and Mo; N is nitrogen; and x, y and z are atomic percentages holding $65 \leq x \leq 94$, $5 \leq y \leq 25$, $0 < z \leq 20$ and $x+y+z=100$. The head includes an oxygen diffusion prevention part of a higher concentration of nitrogen than included in the whole magnetic alloy film which is provided at the magnetic alloy film at an interfacial part to the ferrite core.

28 Claims, 7 Drawing Sheets

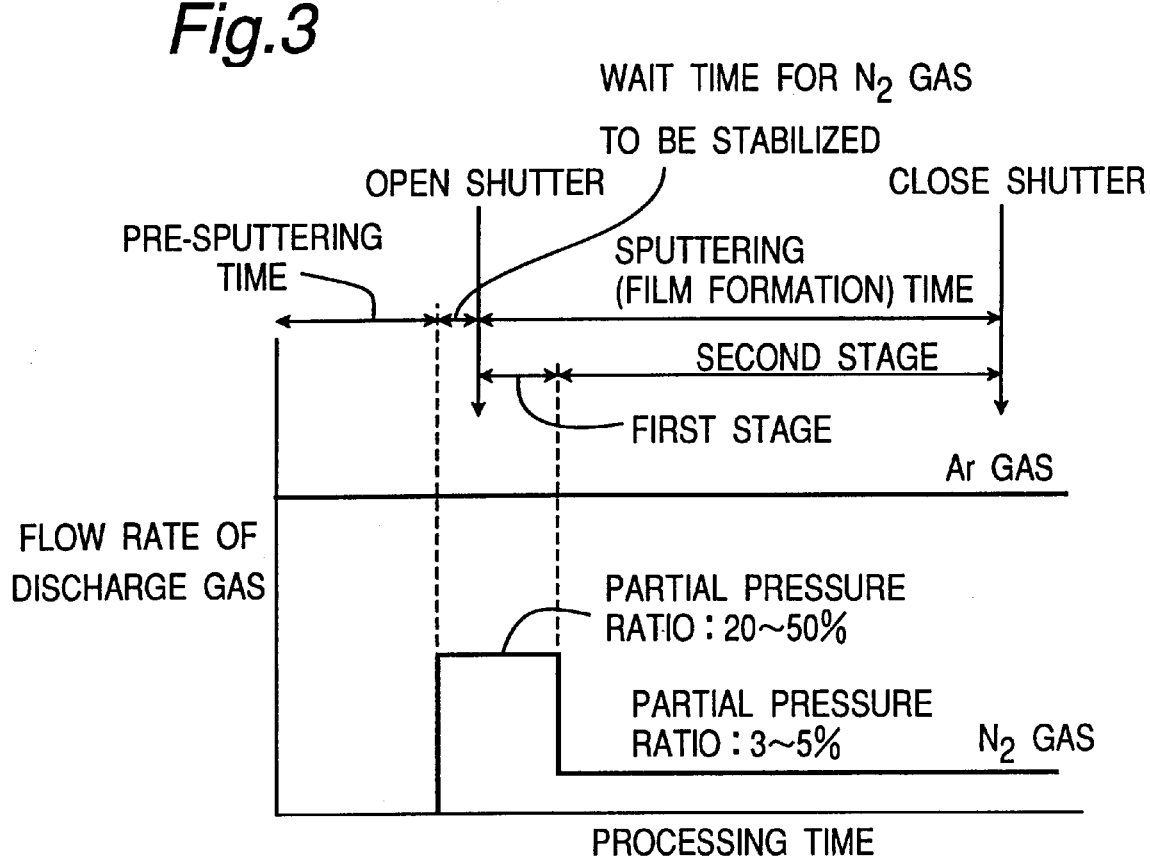

MAGNETIC HEAD AND MANUFACTURING METHOD THEREFOR

BACKGROUND OF THE INVENTION

The present invention relates to a magnetic head used in a magnetic recording/reproducing apparatus such as a VTR or the like and a manufacturing method therefor.

Currently, Metal-In-Gap heads (hereinafter referred to as a "MIG head") are primarily used as magnetic heads in magnetic recording/reproducing apparatuses such as VTRs, etc. The MIG head has a magnetic alloy film of a high saturation magnetic flux density, e.g., Fe-Si-At, Fe-Ta-N or the like film provided in the vicinity of a ferrite head gap. The magnetic alloy film is formed on a ferrite core by a thin film forming method such as sputtering or a similar manner. Therefore, the MIG head is designed to improve recording characteristics, while making use of reproduction characteristics displayed in a conventional ferrite head.

A magnetic head in the simplest constitution is shown in FIG. 5A as an example of the aforementioned MIG head. In FIG. 5A, reference numerals 1–4 represent: 1 a ferrite core; 2 a magnetic alloy film; 3 a magnetic gap formed of $SiO_2$ or the like; and 4 a core-bonding glass.

When Fe-Si-At, Fe-Ta-N or the like alloy is used for the magnetic alloy film 2 of the above-constituted magnetic head, an interfacial part between the ferrite core 1 and magnetic alloy film 2 is subject to counter diffusion, particularly, diffusion of oxygen in the ferrite core 1 into the magnetic alloy film 2 because of the thermal treatment in the manufacturing process, thus resulting in the generation of a nearly non-magnetic layer having a magnetic permeability greatly decreased.

FIG. 5B indicates a depth profile obtained by the Auger electron spectroscopy of an interface between the ferrite core and Fe-Ta-N alloy film in a diffused state after the heat treatment at 500° C. for one hour. Only Fe, N and O signals are excerpted in the diagram. The diffusion of oxygen into the magnetic Fe-Ta-N alloy film is obvious in FIG. 5B. In other words, in the MIG head of the constitution with the interfacial part being parallel to the magnetic gap 3 (referred to as a "parallel MIG head"), an apparent gap (referred to as a "pseudo gap" below) different from the original magnetic gap 3 is disadvantageously formed at the interfacial part, which damages characteristics of the head. A level of a pseudo signal is approximately 5–10 dB although a practical level is 1 dB or lower.

In order to solve the above problem, such magnetic heads constituted as in FIGS. 6 and 7 are devised and put in practical use at present.

The magnetic head of FIG. 6 avoids the pseudo gap by inclining the interfacial part of the ferrite core 1 and magnetic alloy film 2 to the magnetic gap 3. That is, even if an apparent gap is generated at the inclined interfacial part, the gap is inclined to the original magnetic gap 3 and therefore not regarded as the above-discussed pseudo gap. In the constitution of FIG. 6, however, a head track width becomes hard to regulate due to the inclination of the magnetic alloy film 2, leading to high costs and a low yield.

Meanwhile, the interfacial part of the magnetic head between the ferrite core 1 and magnetic alloy film 2 is corrugated in FIG. 7, so that a potential pseudo gap at the interfacial part is definitely distinguished from the original magnetic gap 3. Although the problem of the pseudo gap is eliminated in this arrangement, an extra work which is difficult to carry out in the case of a narrow track is required to process the ferrite core 1 in corrugation.

A magnetic head constituted as in FIG. 8A is also put in practical use. The magnetic head in FIG. 8A is provided with a diffusion prevention film 6 of $SiO_2$, $Al_2O_3$, etc. which is formed and interposed by a thin film forming method such as sputtering or the like method at the interfacial part of the ferrite core 1 and magnetic alloy film 2 of the simple MIG head of FIG. 5A. Although the diffusion prevention film 6 particularly formed at the interfacial part of the ferrite core 1 and magnetic alloy film 2 in FIG. 8A is non-magnetic, the non-magnetic layer is formed in such a small thickness as up to approximately 10 nm thereby to prevent the counter diffusion, and the pseudo gap is restricted to a degree not obstructing the practical use of the magnetic head.

FIG. 8B is a depth profile according to the Auger electron spectroscopy obtained from an $SiO_2$ diffusion prevention film formed about 7 nm thick at the interfacial part of the ferrite core and Fe-Ta-N film and thermally treated at 500° C. for one hour. Fe, N, O and Si signals alone are excerpted in the profile. The diffusion is prevented more effectively than in FIG. 5B.

However, in the magnetic head provided with the diffusion prevention film as above, a minute change in film thickness, stress, adhering force or film structure of the diffusion prevention film 6 due to film formation conditions results in variations of the pseudo signal by 2 dB or so, thereby hindering the production of stable products.

SUMMARY OF THE INVENTION

The object of the present invention is therefore to provide a magnetic head and a manufacturing method therefor whereby the counter diffusion of oxygen at an interfacial part between a ferrite core and a magnetic alloy film is prevented, and a pseudo gap is reduced stably to a practical level or lower, with a good yield and low costs ensured.

In accomplishing these and other aspects, according to a first aspect of the present invention, there is provided a magnetic head including a back core made of ferrite and a magnetic alloy film arranged in a vicinity of a magnetic gap and having an average composition expressed by TxMyNz wherein T is Fe or Co; M is at least one metal selected from a group consisting of Nb, Zr, Ta, Hf, Cr, W and Mo; N is nitrogen; and x, y and z are atomic percentages holding $65 \leq x \leq 94$, $5 \leq y \leq 25$, $0 \leq z \leq 20$ and x+y+z=100, the head comprising an oxygen diffusion prevention part of a higher concentration of nitrogen than included in the whole magnetic alloy film which is provided at the magnetic alloy film at an interfacial part to the ferrite core.

According to a second aspect of the present invention, there is provided a magnetic head including a back core made of ferrite and a magnetic alloy film arranged in a vicinity of a magnetic gap and having an average composition expressed by TxMyNz wherein T is Co; M is at least one metal selected from a group consisting of Nb, Zr, Ta, Hf, Cr, W and Mo; N is nitrogen; and x, y and z are atomic percentages holding $65 \leq x \leq 85$, $10 \leq y < 25$, $0 < z \leq 15$ and x+y+z=100, the head comprising an oxygen diffusion prevention part of a higher concentration of nitrogen than included in the whole magnetic alloy film which is provided at the magnetic alloy film at an interfacial part to the ferrite core.

According to a third aspect of the present invention, there is provided a magnetic head including a back core made of ferrite and a magnetic alloy film arranged in a vicinity of a magnetic gap and having an average composition expressed by TxMyNz wherein T is Fe; M is at least one metal selected from a group consisting of Nb, Zr, Ta, Hf, Cr, W and Mo; N is nitrogen; and x, y and z are atomic percentages holding 70≦x<94, 5≦y≦20, 5≦z≦20 and x+y+z=100, the head comprising an oxygen diffusion prevention part of a higher concentration of nitrogen than included in the whole magnetic alloy film which is provided at the magnetic alloy film at an interfacial part to the ferrite core.

According to a fourth aspect of the present invention, there is provided a magnetic head including a back core made of ferrite and a magnetic alloy film arranged in the vicinity of a magnetic gap and having an average composition expressed by TxMyNz wherein T is Fe; M is Ta; N is nitrogen; and x, y and z are atomic percentages holding 75≦x≦85, 8≦y≦13, 8≦z≦13 and x+y+z=100, the head comprising an oxygen diffusion prevention part of a higher concentration of nitrogen than included in the whole magnetic alloy film which is provided at the magnetic alloy film at an interfacial part to the ferrite core.

According to a fifth aspect of the present invention, there is provided a magnetic head according to any one of the first through fourth aspects, wherein the oxygen diffusion prevention part of the higher concentration of nitrogen has not smaller than twice and not larger than 10 times an average concentration of nitrogen included in the whole magnetic alloy film.

According to a sixth aspect of the present invention, there is provided a magnetic head according to any one of the first through fifth aspects, wherein the oxygen diffusion prevention part is provided at the magnetic alloy film within a distance of 0.03 μm or more from a surface of the ferrite core, having the concentration of nitrogen set to be not smaller than twice and not larger than 10 times an average concentration of nitrogen included in the whole magnetic alloy film.

According to a seventh aspect of the present invention, there is provided a magnetic head according to the sixth aspect, wherein the oxygen diffusion prevention part is provided at the magnetic alloy film within a distance of 0.03 μm through 0.5 μm from a surface of the ferrite core, having the concentration of nitrogen set to be not smaller than twice and not larger than 10 times an average concentration of nitrogen included in the whole magnetic alloy film.

According to an eighth aspect of the present invention, there is provided a magnetic head according to any one of the first through seventh aspects, wherein an oxygen diffusion prevention film of $SiO_2$ or $Al_2O_3$ is formed not smaller than 0.5 nm and not larger than 10 nm thick at an interfacial part between the ferrite core and oxygen diffusion prevention part.

According to a ninth aspect of the present invention, there is provided a method for manufacturing the magnetic head according to any one of the first through eighth aspects, whereby the magnetic alloy film is formed on the ferrite core by reactive sputtering with use of a magnetic target in an atmosphere of a mixed gas of argon and nitrogen, said method comprising:

a first stage of forming a part of the magnetic alloy film of an initial thickness of not smaller than 0.02 μm and not larger than 0.1 μm by controlling a partial pressure ratio of nitrogen gas in the mixed gas atmosphere to be not smaller than 20%; and a second stage of forming the remaining part of the magnetic alloy film by controlling the partial pressure ratio of nitrogen gas to be 5% or smaller when the partial pressure ratio of nitrogen gas η is expressed by $\eta = P_{N2}/P_{Total} \times 100 (\%)$ wherein $P_{N2}$ is a partial pressure of nitrogen gas, and $P_{Total}$ is a sputtering pressure.

According to a tenth aspect of the present invention, there is provided a method for manufacturing the magnetic head according to the ninth aspect, wherein in the first stage, the part of the magnetic alloy film of the initial thickness of not smaller than 0.02 μm and not larger than 0.1 μm is formed by controlling a partial pressure ratio of nitrogen gas in the mixed gas atmosphere to be not smaller than 20% and not larger than 50%.

According to an eleventh aspect of the present invention, there is provided a method for manufacturing the magnetic head according to the ninth or tenth aspect, wherein in the second stage, the remaining part of the magnetic alloy film which has a thickness of 3 μm or more is formed by controlling the partial pressure ratio of nitrogen gas to be 5% or smaller when the partial pressure ratio of nitrogen gas η is expressed by $\eta = P_{N2}/P_{Total} \times 100 (\%)$ wherein $P_{N2}$ is a partial pressure of nitrogen gas and $P_{Total}$ is a sputtering pressure.

According to the magnetic head of the present invention, for coping with the pseudo gap, the oxygen diffusion prevention part of a high nitrogen concentration is provided at the interfacial part of the ferrite core and magnetic alloy film, thus eliminating the necessity for inclining the interfacial part to the magnetic gap or corrugating the interfacial part. A diffusion prevention film of $SiO_2$ or $Al_2O_3$ is not necessarily required at the interfacial part, nevertheless the counter diffusion of oxygen at the interfacial part is prevented. The pseudo gap is restricted to a practical level, in other words, the pseudo gap is suppressed actually not to be generated even when the magnetic gap is parallel to the interfacial part.

Since the magnetic head is comprised of a single magnetic alloy film obtained by forming the oxygen diffusion prevention part of a high nitrogen concentration to the magnetic alloy film, the magnetic head can be mass-produced. Parallel MIG heads with no problem of the pseudo gap are manufactured stably at low costs.

The above oxygen diffusion prevention part is formed of the magnetic alloy film separated at least 0.03 μm, and more, preferably, 0.5 μm or less from the surface of the ferrite core. Moreover, the concentration of nitrogen in the oxygen diffusion prevention part is set to be, for example, not smaller than twice and not larger than ten times the average concentration of nitrogen of the whole magnetic alloy film. Therefore, a nearly non-magnetic layer with a decreased magnetic permeability is prevented from being formed at the interfacial part, and the generation of the pseudo gap is surely limited.

Besides, when the diffusion prevention film of $SiO_2$ or $Al_2O_3$ is interposed not smaller than 0.5 nm and not larger than 10 nm thick at the interfacial part of the ferrite core and magnetic alloy film, the generation of the pseudo gap is furthermore positively restricted.

According to the manufacturing method of the present invention, the magnetic head is obtained in a considerably simple manner, namely, by controlling the concentration of nitrogen during sputtering in two levels. Therefore, the magnetic head can be mass-produced stably at low costs with a high yield.

BRIEF DESCRIPTION OF THE DRAWINGS

These and other aspects and features of the present invention will become clear from the following description taken in conjunction with the preferred embodiments thereof with reference to the accompanying drawings, in which:

FIG. 3 is a diagram explanatory of a control method for a flow rate of Ar and $N_2$ gases during sputtering in the manufacturing method of the first embodiment;

DETAILED DESCRIPTION OF PREFERRED EMBODIMENTS

Figure 1A:
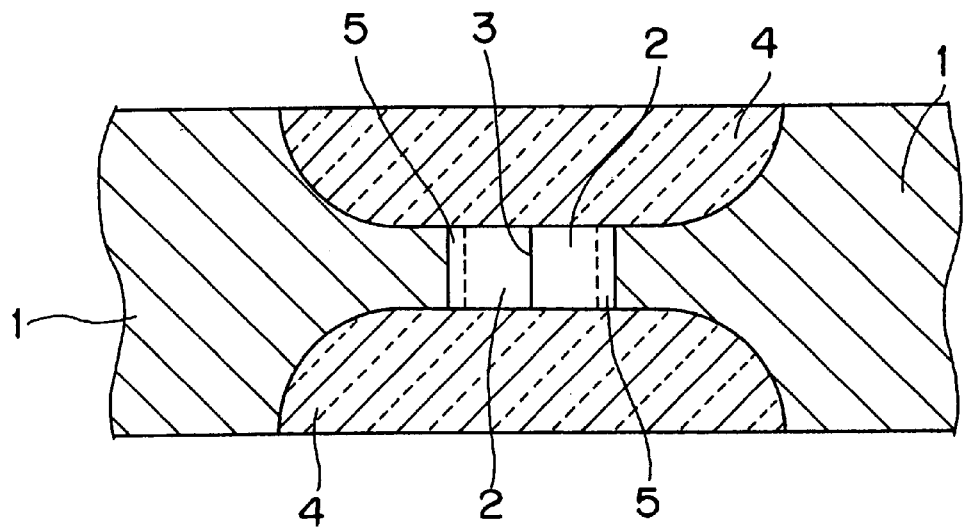
FIG. 1A is a front view of a magnetic head according to a first embodiment of the present invention.

Before the description of the present invention proceeds, it is to be noted that like parts are designated by like reference numerals throughout the accompanying drawings.

A magnetic head and a manufacturing method therefor according to preferred embodiments of the present invention will be described in detail with reference to the accompanying drawings, i.e., FIGS. 1–4.

FIRST EMBODIMENT

FIG. 1A shows a front view of a MIG head according to a first embodiment of the present invention. A diffused state of an interface between a ferrite core 1 and an Fe-Ta-N alloy film of this MIG head is analyzed and represented in a depth profile of FIG. 1B according to the Auger electron spectroscopy. Only Fe, N and O signals are excerpted in the diagram. In the magnetic head of FIG. 1A, reference numerals 1–5 represent: 1 a ferrite core; 2 a magnetic alloy film; 3 a magnetic gap formed of $SiO_2$ or the like; 4 a core-bonding glass; 5 a magnetic alloy film (an oxygen diffusion prevention part) of a high nitrogen concentration. The magnetic head includes the back core 1 made of ferrite and the magnetic alloy film 2 arranged in the vicinity of the magnetic gap 3 and having an average composition expressed by TxMyNz wherein T is Fe or Co; M is at least one metal selected from a group consisting of Nb, Zr, Ta, Hf, Cr, W and Mo; N is nitrogen; and x, y and z are atomic percentages holding $65 \leq x \leq 94$, $5 \leq y \leq 25$, $0 \leq z \leq 20$ and $x+y+z=100$. The oxygen diffusion prevention part (5) of a higher concentration of nitrogen than included in the whole magnetic alloy film is provided at the magnetic alloy film 2 at an interfacial part to the ferrite core 1. In the magnetic head of FIG. 1A, the oxygen diffusion prevention part 5 of a high nitrogen concentration is formed of a magnetic alloy film preferably in a film thickness of preferably 0.03 μm or more because a less-than-0.03 μm thickness film can not actually exhibit its effects, and preferably 0.5 μm or smaller, in contrast to several μm thickness of the magnetic alloy film 2, more specifically, approximately 0.04 μm in the first embodiment.

Figure 1B:
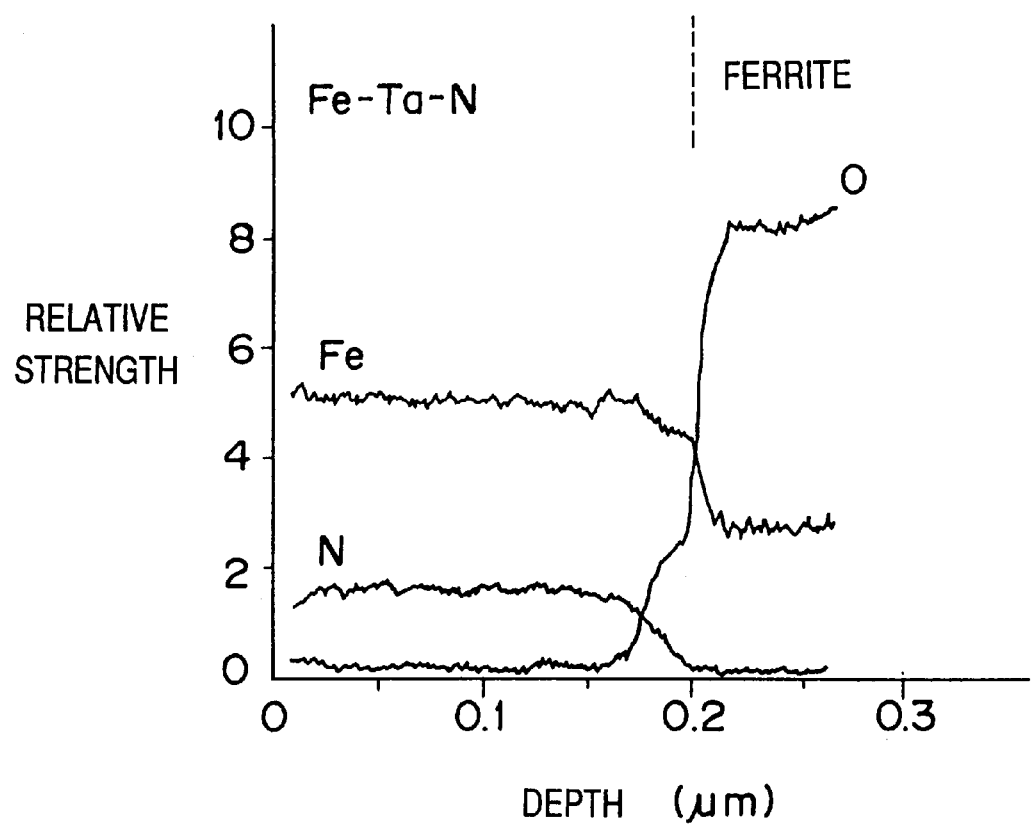
FIG. 1B is a diagram of a depth profile of an interface between a ferrite core and a magnetic alloy film of the magnetic head of FIG. 1A according to the Auger electron spectroscopy.

As is clear from FIG. 1B, the oxygen diffusion at an interfacial part between the ferrite core 1 and magnetic alloy film 2 is almost perfectly prevented in the first embodiment, even without using a diffusion prevention film of $SiO_2$, $Al_2O_3$ or the like. Since a concentration of nitrogen of the oxygen diffusion prevention part 5 formed of the magnetic alloy film separated approximately 0.5 μm or less from a surface of the ferrite core 1 is adjusted to be not smaller than twice and not larger than ten times an average concentration of nitrogen of the whole magnetic alloy film 2 formed on the ferrite core 1, it is prevented that a nearly non-magnetic film with a reduced magnetic permeability is formed at the interfacial part, and a pseudo gap other than an original magnetic gap 3 of $SiO_2$ or the like is avoided. A pseudo signal of the MIG head constituted as above assumes a favorable characteristic of 0.7 dB or lower. The depth profile in FIG. 1B is obtained in a range of 0.2 μm from the surface of the ferrite core 1.

In the first embodiment, a condition of $x \leq 94$ and $y \leq 5$ is required to satisfy soft magnetic properties of the magnetic alloy film 2. At the same time, a condition of $x \geq 65$ and $y \geq 25$ is required for a sufficiently high saturation magnetic flux density of the magnetic alloy film 2. To suppress the pseudo gap necessitates a condition of $z>0$. Further, $z \leq 20$ is necessary so as not to lower a saturation magnetic flux density and not to increase an internal stress of the magnetic alloy film 2 so much.

The first embodiment acts not only to prevent the counter diffusion of oxygen at the interfacial part of the ferrite core 1 and magnetic alloy film 2, but to restrict the pseudo gap even when the interfacial part is parallel to the magnetic gap 3.

SECOND EMBODIMENT

A magnetic head according to a second embodiment of the present invention is obtained by forming the magnetic head of the first embodiment of cobalt series. According to the second embodiment, a back core 1 is formed of ferrite and a magnetic alloy film 2 is arranged in the vicinity of a magnetic gap 3. The magnetic alloy film 2 is of an average composition expressed by TxMyNz wherein T is Co; M is at least one metal selected from TNb, Zr, Ta, Hf, Cr, W and Mo; N is nitrogen; and x, y and z represent atomic percents holding $65 \leq x \leq 85$, $10 \leq y \leq 25$, $0<z \leq 15$ and $x+y+z=100$. An oxygen diffusion prevention part 5 is formed of a magnetic alloy film, at the interfacial part of the magnetic alloy film 2 and ferrite core 1, having the concentration of nitrogen set to be not smaller than twice and not larger than 10 times an average concentration of nitrogen included in the whole magnetic alloy film.

In the second embodiment, $x \leq 85$ and $y \geq 10$ should be fulfilled so as to provide the magnetic alloy film 2 with soft magnetic properties. $x \geq 65$ and $y \leq 25$ is a condition required for the magnetic alloy film 2 to show a sufficiently high saturation magnetic flux density. $z>0$ is necessary to restrict the generation of a pseudo gap and moreover, $z \leq 15$ is required not to decrease the saturation magnetic flux density and not to increase an internal stress of the magnetic alloy film 2 so large.

According to the second embodiment, the counter diffusion of oxygen at the interfacial part of the ferrite core 1 and magnetic alloy film 2 is effectively prevented. Moreover, the pseudo gap is prevented from being generated even if the interfacial part is parallel to the magnetic gap 3.

THIRD EMBODIMENT

A magnetic head according to a third embodiment of the present invention is obtained by forming the magnetic head of the first embodiment of iron series. In the third embodiment, a back core 1 of the magnetic head is formed of ferrite, and a magnetic alloy film 2 in the vicinity of a magnetic gap 3 has an average composition of TxMyNz wherein T is Fe; M is at least one metal selected from TNb, Zr, Ta, Hf, Cr, W and Mo; N is nitrogen; and x, y and z indicate atomic percents holding $70 \leq x \leq 94$, $5 \leq y \leq 20$, $5 \leq z \leq 20$ and $x+y+z=100$. An oxygen diffusion prevention part 5 of a magnetic alloy film having the concentration of nitrogen set to be not smaller than twice and not larger than 10 times an average concentration of nitrogen included in the whole magnetic alloy film is disposed at an interfacial part of the magnetic alloy film 2 and ferrite core 1.

According to the third embodiment, $x \leq 94$ and $y \geq 5$ should be satisfied to make the magnetic alloy film 2 soft magnetic, and $x \geq 70$ and $y \leq 20$ should be fulfilled to attain a sufficiently high saturation magnetic flux density of the magnetic alloy film 2. $z \geq 5$ is a condition necessary for restricting the generation of a pseudo gap, while $z \leq 20$ is a condition not to lower the saturation magnetic flux density and not to greatly increase an internal stress of the magnetic alloy film 2.

The third embodiment is effective to prevent the counter diffusion of oxygen at the interfacial part between the ferrite core 1 and magnetic alloy film 2 and limit the pseudo gap even when the interfacial part is in parallel to the magnetic gap 3.

FOURTH EMBODIMENT

A magnetic head according to a fourth embodiment of the present invention uses the magnetic alloy film of the magnetic head of the first embodiment formed of Fe-Ta-N. In the fourth embodiment, a back core 1 is composed of ferrite and a magnetic alloy film 2 is set in the vicinity of a magnetic gap 3, which has an average composition of TxMyNz wherein T is Fe; M is Ta; N is nitrogen; and x, y and z indicate atomic percents satisfying $75 \leq x \leq 85$, $8 \leq y \leq 13$, $8 \leq z \leq 13$ and $x+y+z=100$. At an interfacial part between the above ferrite core 1 and magnetic alloy film 2 is arranged an oxygen diffusion prevention part 5 of a magnetic alloy film having the concentration of nitrogen set to be not smaller than twice and not larger than 10 times an average concentration of nitrogen included in the whole magnetic alloy film.

In the fourth embodiment, $x \leq 85$ and $y \geq 8$ are required to realize soft magnetic properties of the magnetic alloy film 2. $x \geq 75$ and $y \leq 13$ should be satisfied to allow the magnetic alloy film 2 to show a sufficiently high saturation magnetic flux density. $z \geq 8$ is needed to restrict a pseudo gap. $z \leq 13$ is necessary not to lower the saturation magnetic flux density and not to increase an internal stress of the magnetic alloy film 2 so much.

According to this fourth embodiment, the counter diffusion of oxygen at the interfacial part of the ferrite core 1 and magnetic alloy film 2 is prevented, and the pseudo gap is advantageously restricted even when the interfacial part is parallel to the magnetic gap 3.

Figure 2:
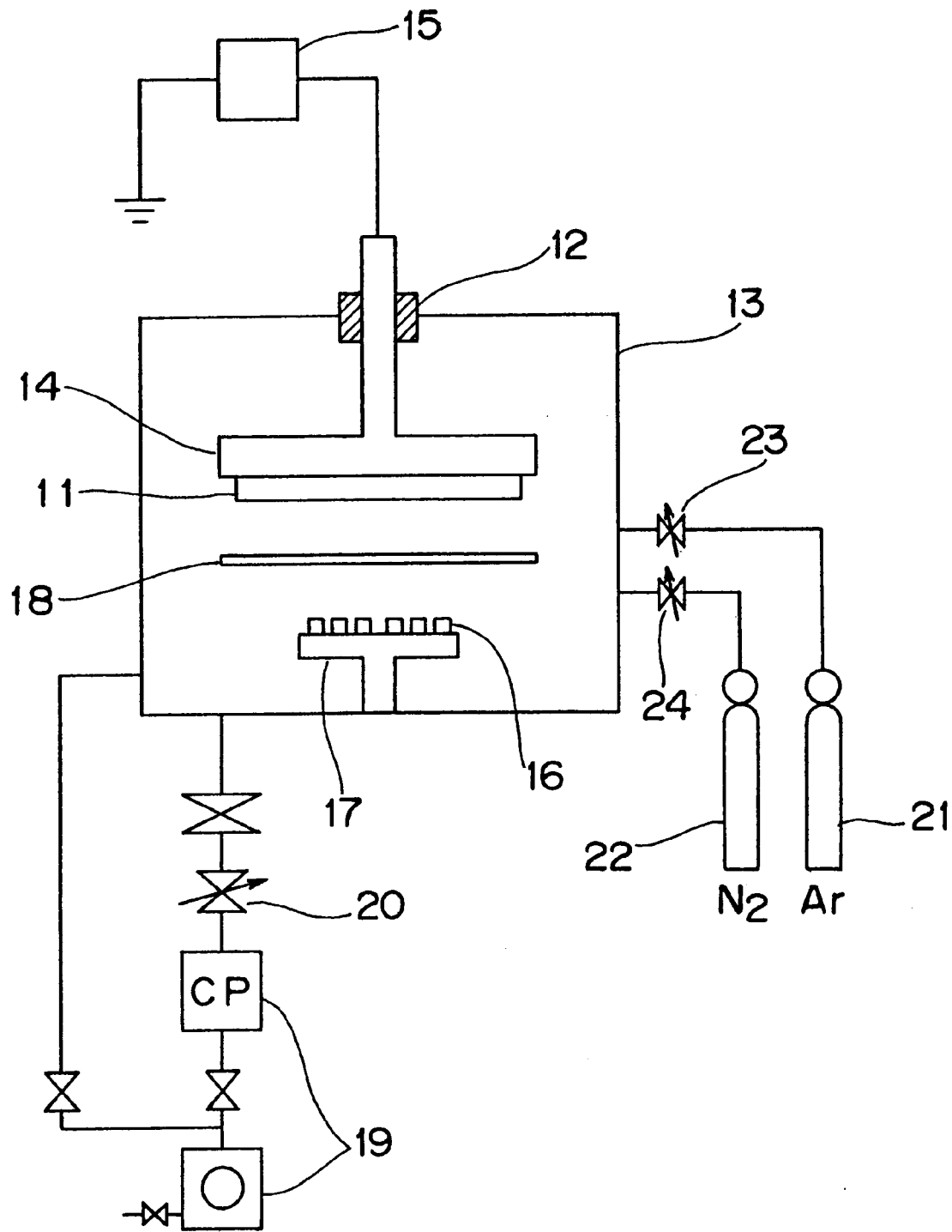
FIG. 2 is a diagram schematically showing the constitution of a reactive sputtering apparatus used in manufacturing the magnetic head of the first embodiment.

A method for manufacturing the magnetic head equipped with the Fe-Ta-N alloy film of the fourth embodiment will be described with reference to FIGS. 2 and 3. A reactive sputtering apparatus for forming the magnetic alloy film is schematically constructed as shown in FIG. 2. Flow rates of Ar and $N_2$ gases during sputtering are controlled in a manner of FIG. 3. The manufacturing method is applicable to other embodiments if a target material, a pressure in a vacuum chamber, a partial pressure ratio of nitrogen gas, a sputtering time, etc. are properly selected.

In FIG. 2, an Fe-Ta target 11 is fitted to a sputtering electrode 14 set in a vacuum chamber 13 via an insulating material 12. A direct current or alternating current sputtering power source 15 is connected to the sputtering electrode 14. A ferrite core 16 is arranged at a position to face the sputtering electrode 14 and held by a substrate holder 17 having a substrate cooler mechanism utilizing cooling water, etc. A shutter 18 is interposed between the sputtering electrode 14 and substrate holder 17 so as to prevent a thin film from being formed to the ferrite core 16 during pre-sputtering. A vacuum discharge system including a vacuum pump 19 is set in the vacuum chamber 13 via a pressure regulation valve 20. Moreover, an Ar gas source 21 and an $N_2$ gas source 22 are respectively connected to gas flow rate controllers 23 and 24 independently of each other.

In the reactive sputtering apparatus prepared as above, the vacuum chamber 13 is first vacuumized to approximately $10^{-7}$ Torr by the vacuum pump 19. Ar gas is guided into the vacuum chamber 13 from the Ar gas source 21 through the gas flow rate controller 23. The vacuum chamber 13 is maintained at a sputtering pressure, i.e., approximately $10^{-2}$ through $10^{-3}$ Torr by the pressure regulation valve 20. Then, a negative high voltage or high frequency voltage is applied to the sputtering electrode 14 by the sputtering power source 15 connected to the sputtering electrode 14, whereby plasma is generated in the vicinity of the target 11, thereby starting sputtering. The shutter 18 is closed at this moment. After the above pre-sputtering for removing impurities on a surface of the target 11 for 10 minutes or so, a sputtering power is set and $N_2$ gas is introduced into the vacuum chamber 13 from the $N_2$ gas source 22 through the gas flow rate controller 24. A partial pressure ratio of nitrogen gas is held at at least 20% or more, and preferably, 50% or less with the use of also the pressure regulation valve 20. The shutter 18 is opened at this time. In consequence, Fe and Ta projected out from the target 11 because of the sputtering phenomenon react with N in the discharge gas, thus forming an Fe-Ta-N alloy film on the ferrite core 16. If the partial pressure ratio is less than 20%, it is insufficient to prevent the diffusion. If more than 50%, too high concentration of nitrogen might cause loss of the film characteristics.

Actually in a first stage of the film formation process, as indicated in FIG. 3, subsequent to the opening of the shutter 18, the Fe-Ta-N alloy film of a high nitrogen concentration for the purpose of preventing the counter diffusion is formed merely 0.02 μm–0.1 μm thick on the ferrite core 16 by maintaining the partial pressure ratio of nitrogen gas at 20–50% and controlling the sputtering time. In other words, a part of the oxygen diffusion prevention part 5 is formed in the first stage. In a next second stage, in order to obtain soft magnetic properties and high saturation magnetic flux density, the partial pressure ratio of nitrogen gas is held at 5% or less, for example, at 3–5% and the sputtering time is controlled. Sputtering is carried out in this state until the thin film of a regulated thickness is formed on the ferrite core 16, thereby to produce the remaining part of the oxygen diffusion prevention part 5, for example, a film at thickness of 3 μm or more because a 1 μm-thickness film cannot exhibit its characteristics, more specifically, 9 μm as a numerical example. The aforementioned partial pressure ratio of nitrogen gas is obtained according to an equation $\eta = P_{N2}/P_{total} \times 100(\%)$ in which $P_{N2}$ is a partial pressure of nitrogen gas and $P_{total}$ is a sputtering pressure.

As discussed hereinabove, the oxygen diffusion prevention part 5 of the magnetic alloy film of high concentration used in the MIG head of the first embodiment is produced in the considerably simple method, that is, simply by controlling the concentration of nitrogen in two stages during the sputtering.

FIFTH EMBODIMENT

In a fifth embodiment of the present invention, an oxygen diffusion prevention film 6 of $SiO_2$ or $Al_2O_3$ is formed in a thickness of not smaller than 0.5 nm and not larger than 10 nm at an interfacial part between the ferrite core 1 and the oxygen diffusion prevention part 5 of the magnetic alloy film at the high nitrogen concentration in the first-fourth embodiments. If the diffusion prevention film 6 is thinner than 0.5 nm, it functions in a dissatisfactory fashion. On the other hand, if $SiO_2$ or $Al_2O_3$ which is non-magnetic exceeds 10 nm, the diffusion prevention film 6 becomes too thick, with causing a pseudo gap itself.

Figure 4A:
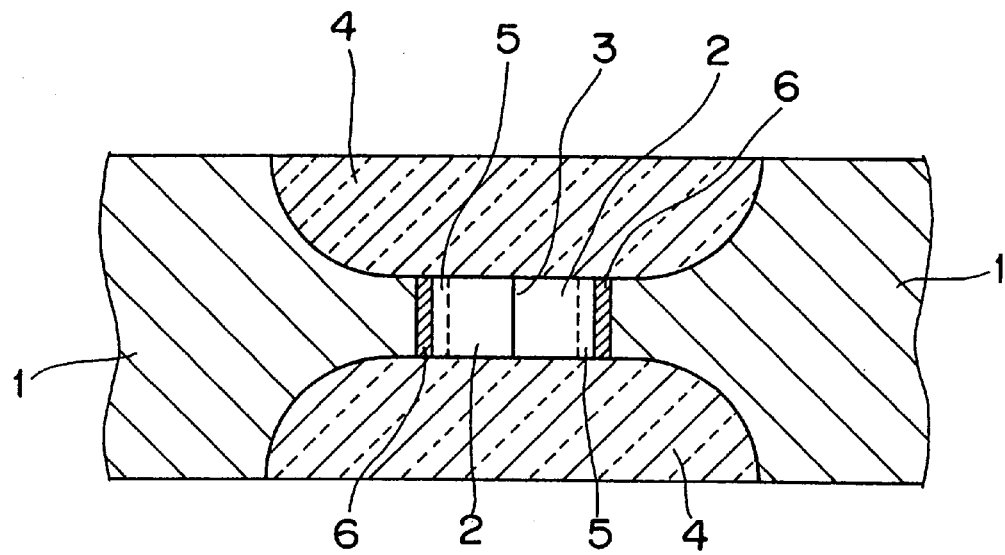
FIG. 4A is a front view of a magnetic head according to a fifth embodiment of the present invention.
Figure 4B:
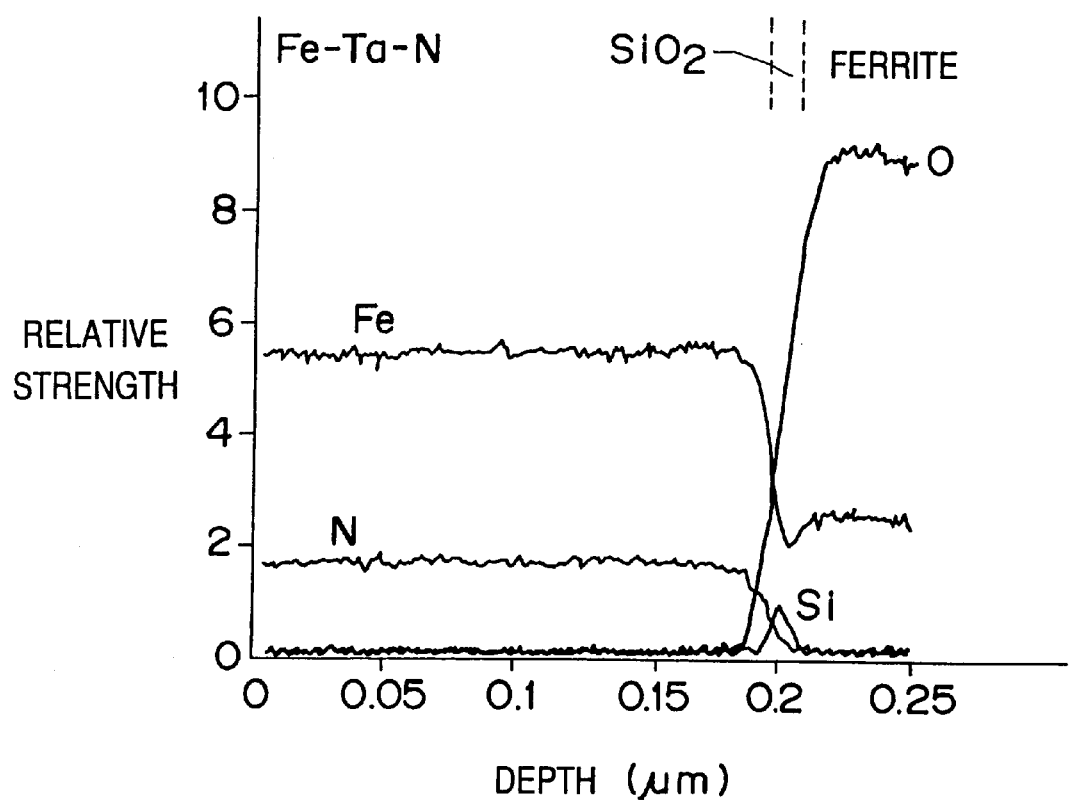
FIG. 4B is a diagram of a depth profile of an interface between a ferrite core and a magnetic alloy film of the magnetic head of FIG. 4A according to the Auger electron spectroscopy.
Figure 5A:
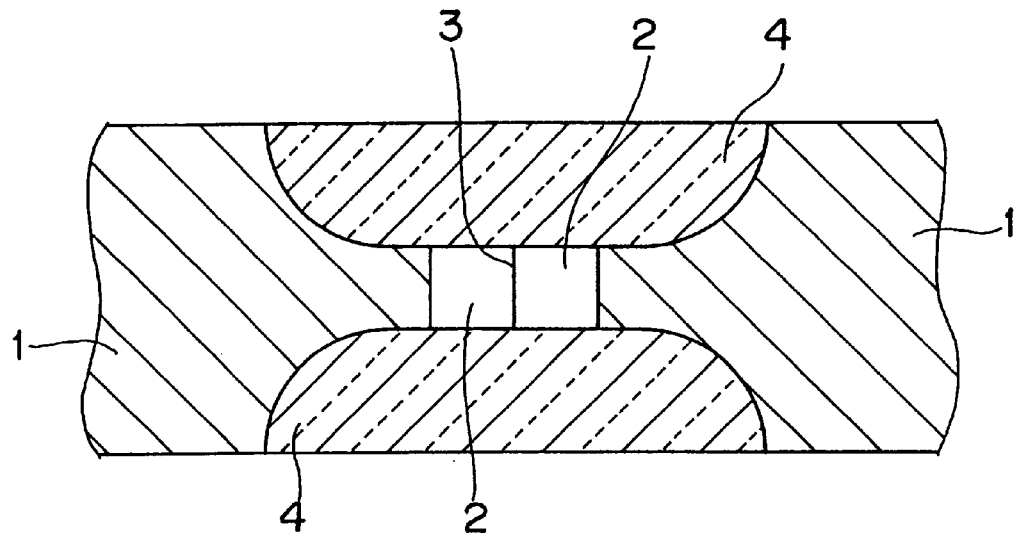
FIG. 5A is a front view of a conventional magnetic head, specifically, a parallel MIG head.
Figure 5B:
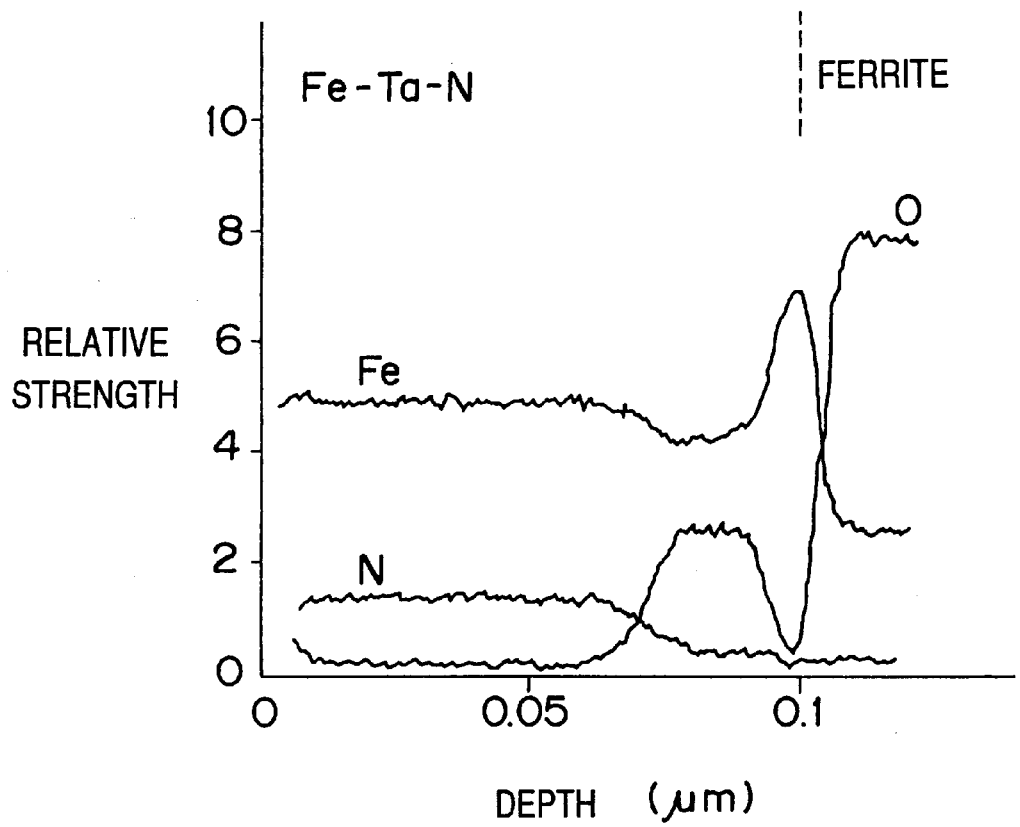
FIG. 5B is a diagram of a depth profile of an interface of a ferrite core and a magnetic alloy film of the MIG head of FIG. 5A according to the Auger electron spectroscopy.
Figure 6:
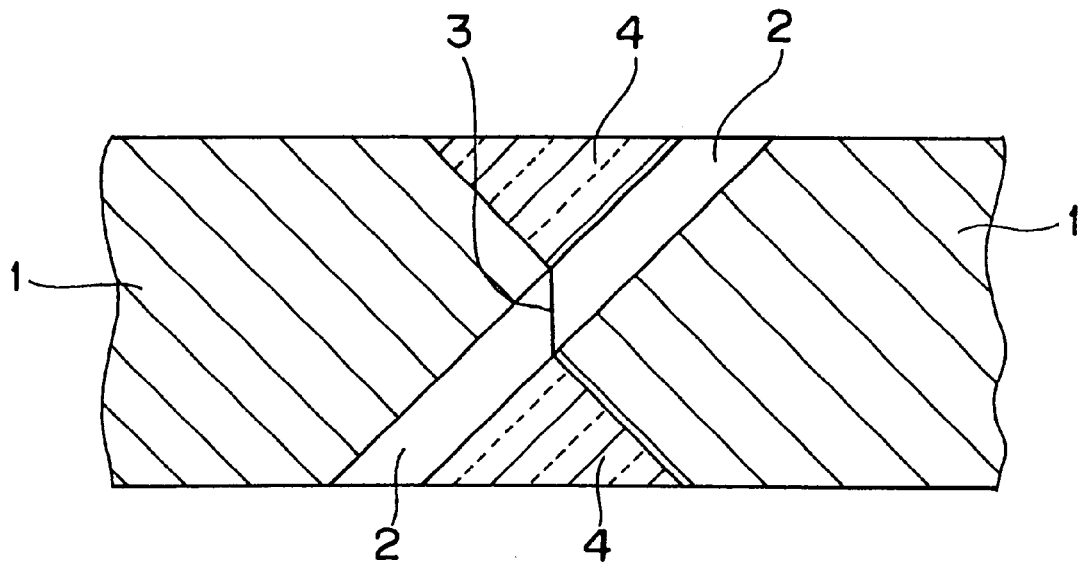
FIG. 6 is a front view of a different conventional MIG head.
Figure 7:
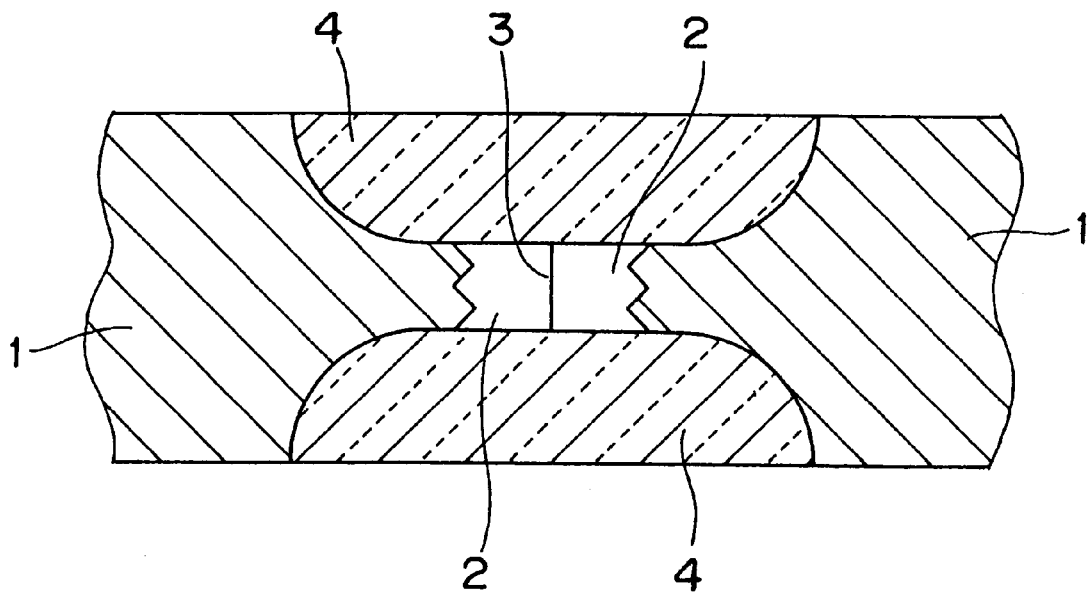
FIG. 7 is a front view of a further different conventional MIG head.
Figure 8A:
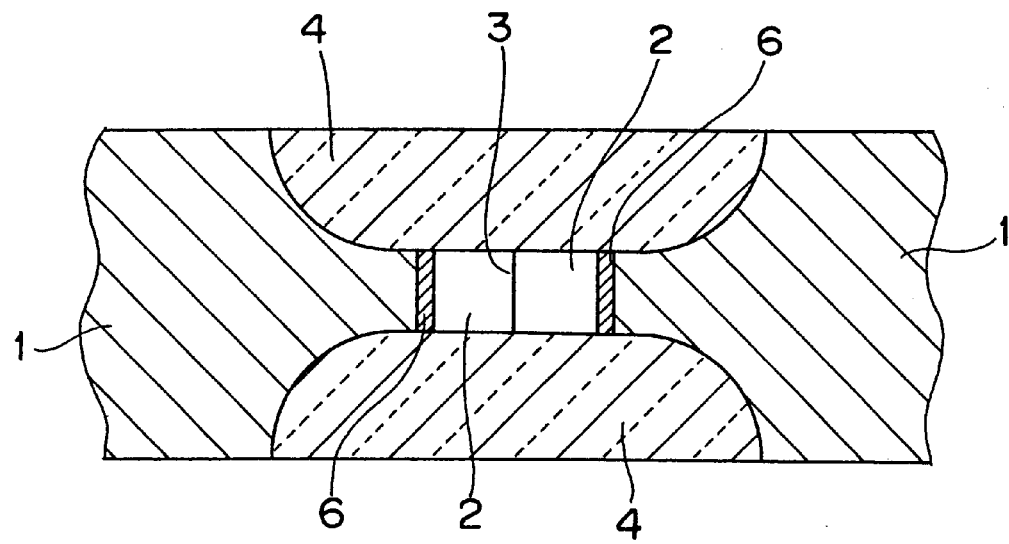
FIG. 8A is a front view of a still different conventional MIG head.
Figure 8B:
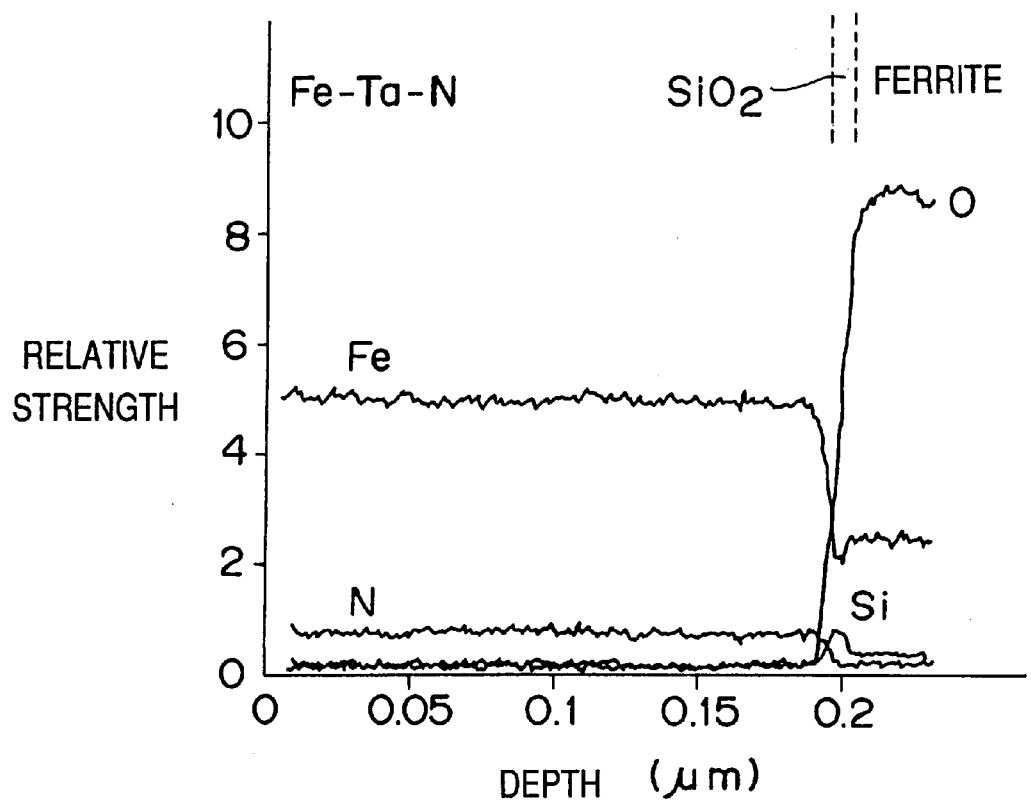
FIG. 8B is a diagram of a depth profile of an interface of a ferrite core and a magnetic alloy film of the MIG head of FIG. 8A according to the Auger electron spectroscopy.

A front view of a MIG head according to the fifth embodiment is indicated in FIG. 4A. FIG. 4B is an analyzed result of a diffused state of an interface between the ferrite core and Fe-Ta-N alloy film of the MIG head in FIG. 4A in the form of a depth profile according to the Auger electron spectroscopy. Only Fe, N, O and Si signals are excerpted.

In the MIG head shown in FIG. 4A, reference numerals 1–6 are respectively a ferrite core, a magnetic alloy film, a magnetic gap of $SiO_2$ or the like, a corebonding glass, an oxygen diffusion prevention part formed of a magnetic alloy film of a high nitrogen concentration, and the above-mentioned diffusion prevention film of $SiO_2$ or $Al_2O_3$ formed by a thin film forming method such as sputtering or the like manner. The thickness of the oxygen diffusion prevention part 5 of the magnetic alloy film at the high nitrogen concentration is not larger than 0.5 μm, while that of the magnetic alloy film 2 is several μm. Specifically, the oxygen diffusion prevention part 5 is formed about 0.04 μm thick according to this fifth embodiment. $SiO_2$ interposed about 7 nm as the diffusion prevention film 6 at the interfacial part of the ferrite core 1 and Fe-Ta-N film 2 more surely prevents the counter diffusion at the interfacial part thereby to restrict the generation of the pseudo gap.

As is made clear from FIG. 4B, in the fifth embodiment, an almost non-magnetic layer with the magnetic permeability decreased is prevented from being formed at the interfacial part, and moreover the formation of the pseudo gap is more surely restricted owing to the diffusion prevention film, because the concentration of nitrogen of the oxygen diffusion prevention part 5 separated 0.5 μm or so from the surface of the ferrite core 1 is adjusted to be not smaller than twice and not larger than ten times an average concentration of nitrogen of the whole magnetic alloy film and also the diffusion prevention film formed of $SiO_2$ or $Al_2O_3$ of 0.5 nm or larger and 10 nm or smaller thickness is used. A pseudo signal of the MIG head in the above constitution shows a favorable characteristic of 0.7 dB or lower. FIG. 4B shows the depth profile in a range of 0.2 μm from the surface of the ferrite core 1.

In any of the foregoing embodiments, the oxygen diffusion prevention part 5 of the magnetic alloy film of a high nitrogen concentration is provided at the magnetic alloy film 2 within a distance of 0.5 μm from the surface of the ferrite core 1. Moreover, the concentration of nitrogen of the oxygen diffusion prevention part 5 of the magnetic alloy film 2 is preferably adjusted to be not smaller than twice and not larger than 10 times the concentration of nitrogen of the whole magnetic alloy film including the oxygen diffusion prevention part 5. If the oxygen diffusion prevention part 5 goes beyond the 0.5 μm distance from the surface of the ferrite core 1, an area of the high nitrogen concentration occupies more to the whole magnetic alloy film, increasing the nitrogen concentration of the whole magnetic alloy film too large thereby to possibly damage magnetic properties. Therefore, the oxygen diffusion prevention part 5 is preferably separated 0.5 μm or smaller from the surface of the ferrite core 1. The nitrogen concentration of the oxygen diffusion prevention part 5 is set to be not smaller than two times and not larger than 10 times the average nitrogen concentration, because the diffusion prevention function is exerted not enough if the nitrogen concentration of the oxygen diffusion prevention part 5 is smaller than twice the average concentration and the magnetic properties are broken if the nitrogen concentration of the oxygen diffusion prevention part 5 exceeds ten times the average concentration.

According to each of the above embodiments, the oxygen diffusion prevention part 5 of the magnetic alloy film of the high nitrogen concentration is formed at the interfacial part of the ferrite core 1 and magnetic alloy film 2 of the MIG head. Accordingly, the counter diffusion of oxygen at the interfacial part of the ferrite core 1 and the magnetic alloy film 2 is controlled, obstructing the generation of the pseudo gap even when the interfacial part is parallel to the magnetic gap. In addition, since the MIG head is comprised of a single magnetic alloy film obtained by forming the oxygen diffusion prevention part 5 of the magnetic alloy film of the high nitrogen concentration to the magnetic alloy film 2, the parallel MIG head of the invention can be mass-produced stably at low costs without requiring consideration into the magnetic gap.

The entire disclosure of Japanese Patent Application No. 8-237718 filed on Sep. 9, 1996, including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic head including a back core made of ferrite and a magnetic alloy film arranged in a vicinity of a magnetic gap and having an average composition expressed by TxMyNz wherein T is Fe or Co; M is at least one metal selected from the group consisting of Nb, Zr, Ta, Hf, Cr, W and Mo; N is nitrogen; and x, y and z are atomic percentages holding $65 \leq x \leq 94$, $5 \leq y \leq 25$, $0 \leq z \leq 20$ and x+y+z=100, the head comprising an oxygen diffusion prevention part having a concentration of nitrogen not smaller than twice and not larger than 10 times an average concentration of nitrogen included in the whole magnetic alloy film, which is provided at the magnetic alloy film at an interfacial part to the ferrite core.

2. A magnetic head according to claim 1, wherein the oxygen diffusion prevention part is provided at the magnetic alloy film within a distance of 0.03 μm or more from a surface of the ferrite core.

3. A magnetic head according to claim 2, wherein the oxygen diffusion prevention part is provided at the magnetic alloy film within a distance of 0.03 μm through 0.5 μm from a surface of the ferrite core.

4. A magnetic head according to claim 1, wherein an oxygen diffusion prevention film of $SiO_2$ or $Al_2O_3$ is formed not smaller than 0.5 nm and not larger than 10 nm thick at an interfacial part between the ferrite core and oxygen diffusion prevention part.

5. A method for manufacturing the magnetic head according to claim 1, whereby the magnetic alloy film is formed on the ferrite core by reactive sputtering with use of a magnetic target in an atmosphere of a mixed gas of argon and nitrogen, said method comprising:

a first stage of forming a part of the magnetic alloy film of an initial thickness of not smaller than 0.02 μm and not larger than 0.1 μm by controlling a partial pressure ratio of nitrogen gas in the mixed gas atmosphere to be not smaller than 20%; and a second stage of forming the remaining part of the magnetic alloy film by controlling the partial pressure ratio of nitrogen gas to be 5% or smaller when the partial pressure ratio of nitrogen gas η is expressed by $\eta = P_{N2}/P_{Total} \times 100(\%)$ wherein $P_{N2}$ is a partial pressure of nitrogen gas, and $P_{Total}$ is a sputtering pressure.

6. A method for manufacturing the magnetic head according to claim 5, wherein in the first stage, the part of the magnetic alloy film of the initial thickness of not smaller than 0.02 μm and not larger than 0.1 μm is formed by controlling a partial pressure ratio of nitrogen gas in the mixed gas atmosphere to be not smaller than 20% and not larger than 50%.

7. A method for manufacturing the magnetic head according to claim 5, wherein in the second stage, the remaining part of the magnetic alloy film which has a thickness of 3 μm or more is formed by controlling the partial pressure ratio of nitrogen gas to be 5% or smaller when the partial pressure ratio of nitrogen gas η is expressed by $\eta = P_{N2}/P_{Total} \times 100(\%)$ wherein $P_{N2}$ is a partial pressure of nitrogen gas and $P_{Total}$ is a sputtering pressure.

8. A magnetic head including a back core made of ferrite and a magnetic alloy film arranged in a vicinity of a magnetic gap and having an average composition expressed by TxMyNz wherein T is Co; M is at least one metal selected from the group consisting of Nb, Zr, Ta, Hf, Cr, W and Mo; N is nitrogen; and x, y and z are atomic percentages holding $65 \leq x \leq 85$, $10 \leq y \leq 25$, $0 < z \leq 15$ and $x+y+z=100$, the head comprising an oxygen diffusion prevention part having a concentration of nitrogen not smaller than twice and not larger than 10 times an average concentration of nitrogen included in the whole magnetic alloy film, which is provided at the magnetic alloy film at an interfacial part to the ferrite core.

9. A magnetic head according to claim 8, wherein the oxygen diffusion prevention part is provided at the magnetic alloy film within a distance of 0.03 μm or more from a surface of the ferrite core.

10. A magnetic head according to claim 9, wherein the oxygen diffusion prevention part is provided at the magnetic alloy film within a distance of 0.03 μm through 0.5 μm from a surface of the ferrite core.

11. A magnetic head according to claim 8, wherein an oxygen diffusion prevention film of $SiO_2$ or $Al_2O_3$ is formed not smaller than 0.5 nm and not larger than 10 nm thick at an interfacial part between the ferrite core and oxygen diffusion prevention part.

12. A method for manufacturing the magnetic head according to claim 8, whereby the magnetic alloy film is formed on the ferrite core by reactive sputtering with use of a magnetic target in an atmosphere of a mixed gas of argon and nitrogen, said method comprising:

a first stage of forming a part of the magnetic alloy film of an initial thickness of not smaller than 0.02 μm and not larger than 0.1 μm by controlling a partial pressure ratio of nitrogen gas in the mixed gas atmosphere to be not smaller than 20%; and a second stage of forming the remaining part of the magnetic alloy film by controlling the partial pressure ratio of nitrogen gas to be 5% or smaller when the partial pressure ratio of nitrogen gas η is expressed by $\eta = P_{N2}/P_{Total} \times 100(\%)$ wherein $P_{N2}$ is a partial pressure of nitrogen gas, and $P_{Total}$ is a sputtering pressure.

13. A method for manufacturing the magnetic head according to claim 12, wherein in the first stage, the part of the magnetic alloy film of the initial thickness of not smaller than 0.02 μm and not larger than 0.1 μm is formed by controlling a partial pressure ratio of nitrogen gas in the mixed gas atmosphere to be not smaller than 20% and not larger than 50%.

14. A method for manufacturing the magnetic head according to claim 12, wherein in the second stage, the remaining part of the magnetic alloy film which has a thickness of 3 μm or more is formed by controlling the partial pressure ratio of nitrogen gas to be 5% or smaller when the partial pressure ratio of nitrogen gas η is expressed by $\eta = P_{N2}/P_{Total} \times 100(\%)$ wherein $P_{N2}$ is a partial pressure of nitrogen gas and $P_{Total}$ is a sputtering pressure.

15. A magnetic head including a back core made of ferrite and a magnetic alloy film arranged in a vicinity of a magnetic gap and having an average composition expressed by TxMyNz wherein T is Fe; M is at least one metal selected from the group consisting of Nb, Zr, Ta, Hf, Cr, W and Mo; N is nitrogen; and x, y and z are atomic percentages holding $70 \leq x \leq 94$, $5 \leq y \leq 20$, $5 \leq z \leq 20$ and $x+y+z=100$, the head comprising an oxygen diffusion prevention part having a concentration of nitrogen not smaller than twice and not larger than 10 times an average concentration of nitrogen included in the whole magnetic alloy film, which is provided at the magnetic alloy film at an interfacial part to the ferrite core.

16. A magnetic head according to claim 15, wherein the oxygen diffusion prevention part is provided at the magnetic alloy film within a distance of 0.03 μm or more from a surface of the ferrite core.

17. A magnetic head according to claim 16, wherein the oxygen diffusion prevention part is provided at the magnetic alloy film within a distance of 0.03 μm through 0.5 μm from a surface of the ferrite core.

18. A magnetic head according to claim 15, wherein an oxygen diffusion prevention film of $SiO_2$ or $Al_2O_3$ is formed not smaller than 0.5 nm and not larger than 10 nm thick at an interfacial part between the ferrite core and oxygen diffusion prevention part.

19. A method for manufacturing the magnetic head according to claim 15, whereby the magnetic alloy film is formed on the ferrite core by reactive sputtering with use of a magnetic target in an atmosphere of a mixed gas of argon and nitrogen, said method comprising:

a first stage of forming a part of the magnetic alloy film of an initial thickness of not smaller than 0.02 μm and not larger than 0.1 μm by controlling a partial pressure ratio of nitrogen gas in the mixed gas atmosphere to be not smaller than 20%; and a second stage of forming the remaining part of the magnetic alloy film by controlling the partial pressure ratio of nitrogen gas to be 5% or smaller when the partial pressure ratio of nitrogen gas η is expressed by η=$P_{N2}/P_{Total}$33 100(%) wherein $P_{N2}$ is a partial pressure of nitrogen gas, and $P_{Total}$ is a sputtering pressure.

20. A method for manufacturing the magnetic head according to claim 19, wherein in the first stage, the part of the magnetic alloy film of the initial thickness of not smaller than 0.02 μm and not larger than 0.1 μm is formed by controlling a partial pressure ratio of nitrogen gas in the mixed gas atmosphere to be not smaller than 20% and not larger than 50%.

21. A method for manufacturing the magnetic head according to claim 19, wherein in the second stage, the remaining part of the magnetic alloy film which has a thickness of 3 μm or more is formed by controlling the partial pressure ratio of nitrogen gas to be 5% or smaller when the partial pressure ratio of nitrogen gas η is expressed by η=$P_{N2}/P_{Total}$×100(%) wherein $P_{N2}$ is a partial pressure of nitrogen gas and $P_{Total}$ is a sputtering pressure.

22. A magnetic head including a back core made of ferrite and a magnetic alloy film arranged in the vicinity of a magnetic gap and having an average composition expressed by TxMyNz wherein T is Fe; M is Ta; N is nitrogen; and x, y and z are atomic percentages holding 75≦x≦85, 8≦y≦13, 8≦z≦13 and x+y+z=100, the head comprising an oxygen diffusion prevention part having a concentration of nitrogen not smaller than twice and not larger than 10 times an average concentration of nitrogen included in the whole magnetic alloy film, which is provided at the magnetic alloy film at an interfacial part to the ferrite core.

23. A magnetic head according to claim 22, wherein the oxygen diffusion prevention part is provided at the magnetic alloy film within a distance of 0.03 μm or more from a surface of the ferrite core.

24. A magnetic head according to claim 23, wherein the oxygen diffusion prevention part is provided at the magnetic alloy film within a distance of 0.03 μm through 0.5 μm from a surface of the ferrite core.

25. A magnetic head according to claim 22, wherein an oxygen diffusion prevention film of $SiO_2$ or $Al_2O_3$ is formed not smaller than 0.5 nm and not larger than 10 nm thick at an interfacial part between the ferrite core and oxygen diffusion prevention part.

26. A method for manufacturing the magnetic head according to claim 22, whereby the magnetic alloy film is formed on the ferrite core by reactive sputtering with use of a magnetic target in an atmosphere of a mixed gas of argon and nitrogen, said method comprising:

a first stage of forming a part of the magnetic alloy film of an initial thickness of not smaller than 0.02 μm and not larger than 0.1 μm by controlling a partial pressure ratio of nitrogen gas in the mixed gas atmosphere to be not smaller than 20%; and a second stage of forming the remaining part of the magnetic alloy film by controlling the partial pressure ratio of nitrogen gas to be 5% or smaller when the partial pressure ratio of nitrogen gas η is expressed by η=$P_{N2}/P_{Total}$×100(%) wherein $P_{N2}$ is a partial pressure of nitrogen gas, and $P_{Total}$ is a sputtering pressure.

27. A method for manufacturing the magnetic head according to claim 26, wherein in the first stage, the part of the magnetic alloy film of the initial thickness of not smaller than 0.02 μm and not larger than 0.1 μm is formed by controlling a partial pressure ratio of nitrogen gas in the mixed gas atmosphere to be not smaller than 20% and not larger than 50%.

28. A method for manufacturing the magnetic head according to claim 26, wherein in the second stage, the remaining part of the magnetic alloy film which has a thickness of 3 μm or more is formed by controlling the partial pressure ratio of nitrogen gas to be 5% or smaller when the partial pressure ratio of nitrogen gas η is expressed by η=$P_{N2}/P_{Total}$×100(%) wherein $P_{N2}$ is a partial pressure of nitrogen gas and $P_{Total}$ is a sputtering pressure.

* * * * *